(12) United States Patent
Zhang et al.

(10) Patent No.: US 10,789,704 B2
(45) Date of Patent: Sep. 29, 2020

(54) ABNORMALITY DETECTION FOR PERIODIC PATTERNS

(71) Applicant: Zhongke Jingyuan Electron Limited, Beijing (CN)

(72) Inventors: Zhaoli Zhang, Beijing (CN); Weimin Ma, Beijing (CN); Kangkang Yang, Beijing (CN); Yan Zhao, Beijing (CN)

(73) Assignee: Zhongke Jingyuan Electron Limited, Beijing (CN)

( * ) Notice: Subject to any disclaimer, the term of this patent is extended or adjusted under 35 U.S.C. 154(b) by 56 days.

(21) Appl. No.: 16/280,730

(22) Filed: Feb. 20, 2019

(65) Prior Publication Data
US 2020/0242746 A1 Jul. 30, 2020

(30) Foreign Application Priority Data
Jan. 24, 2019 (CN) .......................... 2019 1 0067930

(51) Int. Cl.
G06K 9/00 (2006.01)
G06T 7/00 (2017.01)
(Continued)

(52) U.S. Cl.
CPC .......... *G06T 7/001* (2013.01); *G01N 21/8851* (2013.01); *G01N 21/9501* (2013.01);
(Continued)

(58) Field of Classification Search
CPC ............... H01L 22/12; G01N 21/9501; G01N 21/8851; G01N 21/88; G01N 21/95; G01N 21/8806; G01N 2021/8858; G01N 2021/8874; G01N 2021/8877; G01N 2021/887; G03F 1/38; G03F 1/42; G03F 1/44; G06T 7/70; G06T 2207/30148; G06T 2207/30164; G06T 7/0008; G06T 7/0004; G06T 7/13; G06T 7/00; G06T 2207/30121; B23Q 17/2452; B23Q 17/2457; B23Q 17/2471; B23Q 17/249; G05B 2219/31432; G05B 2219/36251; G05B 2219/37555; G05B 2219/37578; G05B 2219/50064; G06K 9/40; G06K 9/48; G06K 9/3216;
(Continued)

(56) References Cited

U.S. PATENT DOCUMENTS

| 6,400,128 | B2 * | 6/2002 | Guidotti | G01R 31/50 324/73.1 |
| 7,068,363 | B2 * | 6/2006 | Bevis | G01N 21/474 356/237.5 |
| 2004/0246476 | A1 * | 12/2004 | Bevis | G01N 21/474 356/237.5 |

* cited by examiner

*Primary Examiner* — Duy M Dang
(74) *Attorney, Agent, or Firm* — Young Basile Hanlon & MacFarlane, P.C.

(57) ABSTRACT

Methods, apparatuses, and systems for image-based abnormality detection for periodic patterns are provided. The method includes receiving an image pattern T determined from an inspection image, wherein T comprises multiple periodic segments along a spatial direction; determining, by a processor, a first reference pattern R1 by rearranging the multiple periodic segments of T in a first manner and a second reference pattern R2 by rearranging the multiple periodic segments of T in a second manner; determining whether an abnormality exists in T by comparing a part of T with a part of R1 and a part of R2; and determining that the abnormality exists in T based on a determination that the part of T is different from the part of R1 and the part of R2.

20 Claims, 5 Drawing Sheets

(51) Int. Cl.
*G01N 21/88* (2006.01)
*G01N 21/95* (2006.01)
*G07D 7/206* (2016.01)

(52) U.S. Cl.
CPC ..... *G07D 7/206* (2017.05); *G01N 2021/8887* (2013.01); *G06T 2207/30148* (2013.01)

(58) Field of Classification Search
CPC ...... G06K 9/4633; G06K 9/52; G06K 9/6267; G06K 9/62; H04N 5/23222; H04N 5/23225; H04N 5/2258; H04N 5/225; H04N 5/232; G06Q 30/0278; G06Q 30/02
See application file for complete search history.

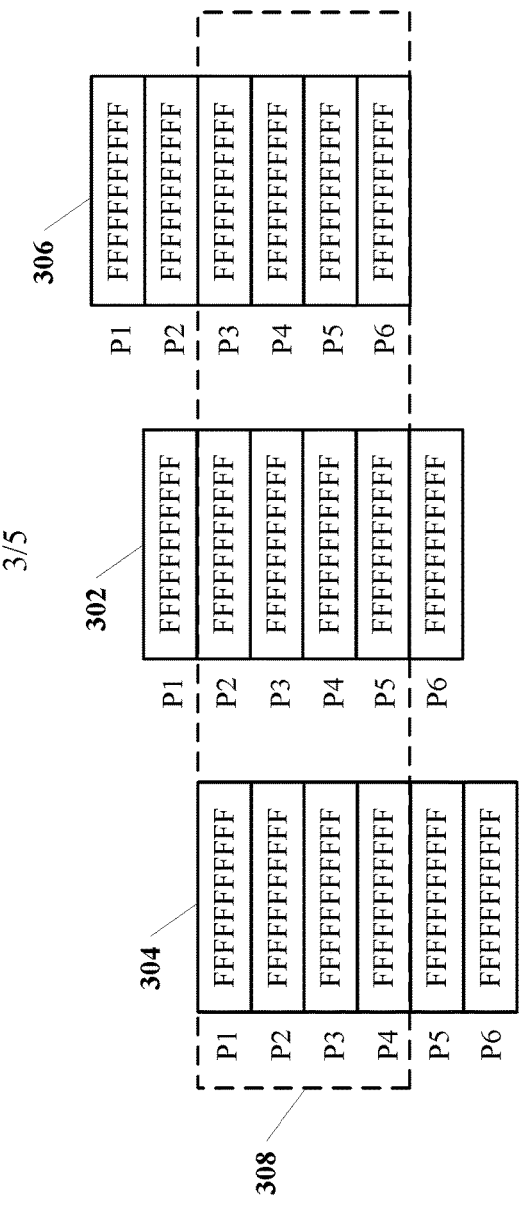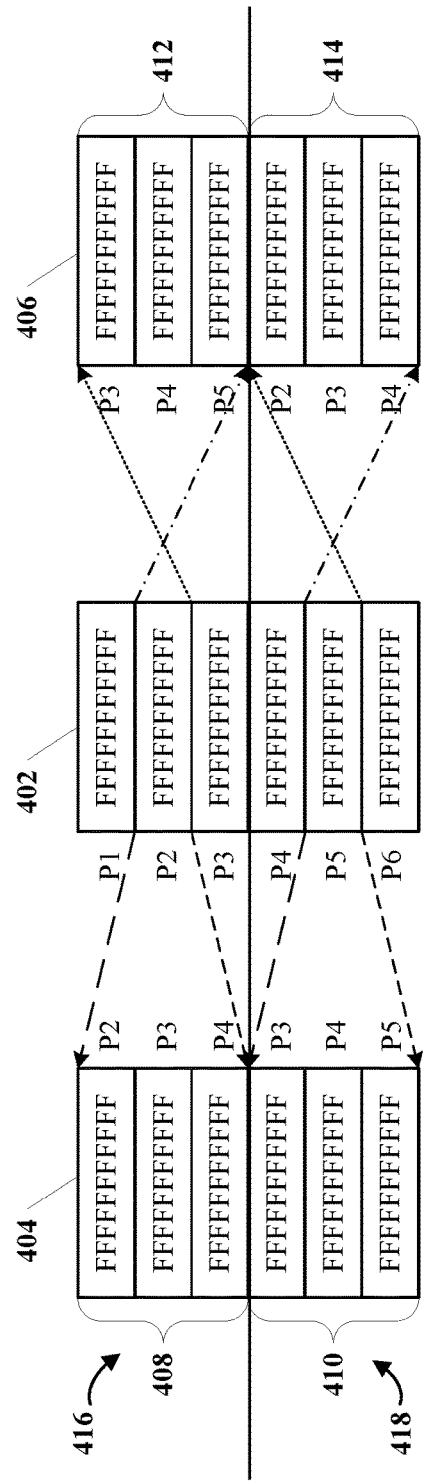
FIG. 3 (Prior Art)
FIG. 4

ABNORMALITY DETECTION FOR PERIODIC PATTERNS

CROSS-REFERENCE TO RELATED APPLICATION(S)

This application claims priority to and the benefit of Chinese Patent Application No. 201910067930.1, filed on Jan. 24, 2019, the entire disclosure of which is hereby incorporated by reference in its entirety.

TECHNICAL FIELD

This disclosure relates to the field of abnormality detection for periodic patterns, in particular, to abnormality detection for periodic patterns of images.

BACKGROUND

Periodic patterns exist in many manufacturing process, such as printed materials (e.g., currency notes, articles, tickets, or ledgers) or manufactured semiconductor devices (e.g., dies of integrated circuits or masks). The periodic patterns are supposed to be repeated in the manufacturing process without any error or defect, but defects are difficult to avoid in final products due to limitations of the process. To detect defects in the periodic patterns, optical or electron-beam (referred to as "e-beam") inspection devices can be used. A surface of a sample can be scanned to generate an inspection image. Image processing methods can be used to inspect and identify potential defects from the inspection image.

Inspection images generally include image units (or referred to as "periods" or "periodic segments") that are periodically repeated in space. For example, for currency printing, a printed, uncut banknote sheet includes multiple printed banknotes, a pattern in an inspection image that represents a banknote of the banknote sheet can be one periodic segment. For another example, for an integrated circuit (referred to as "IC") that includes multiple repeated unit structures, a pattern in an inspection image that represents a unit structure of the IC can be one periodic segment.

Abnormalities are inconsistent pattern features between different periods and can exist in a periodic pattern. Abnormalities can indicate a target feature or a defect. Therefore, methods to detect abnormalities in period patterns are strived for. To detect such abnormalities, reference patterns can be generated and compared with the periodic pattern. During processing, the periodic patterns are usually processed in units that have a limited length.

SUMMARY

Disclosed herein are implementations of methods, apparatuses, and systems of image-based abnormality detection for periodic patterns.

In an aspect, a method of image-based abnormality detection for periodic patterns is disclosed. The method includes receiving an image pattern T determined from an inspection image, wherein T comprises multiple periodic segments along a spatial direction; determining, by a processor, a first reference pattern R1 by rearranging the multiple periodic segments of T in a first manner and a second reference pattern R2 by rearranging the multiple periodic segments of T in a second manner; determining whether an abnormality exists in T by comparing a part of T with a part of R1 and a part of R2; and determining that the abnormality exists in T based on a determination that the part of T is different from the part of R1 and the part of R2.

In another aspect, an apparatus of image-based abnormality detection for periodic patterns is disclosed. The apparatus includes a processor and a memory. The memory is coupled to the processor and configured to store instructions which when executed by the processor become operational with the processor to receive an image pattern T determined from an inspection image, wherein T comprises multiple periodic segments along a spatial direction; determine a first reference pattern R1 by rearranging the multiple periodic segments of T in a first manner and a second reference pattern R2 by rearranging the multiple periodic segments of T in a second manner; and determine that an abnormality exists in T based on a determination that a part of T is different from a part of R1 and a part of R2, after comparing the part of T with the part of R1 and the part of R2.

In another aspect, a non-transitory computer-readable storage medium comprising instructions for image-based abnormality detection for periodic patterns is disclosed. When the instructions are executed by a processor, they become operational with the processor to receive an image pattern T determined from an inspection image, wherein T comprises multiple periodic segments along a spatial direction; determine a first reference pattern R1 by rearranging the multiple periodic segments of T in a first manner and a second reference pattern R2 by rearranging the multiple periodic segments of T in a second manner; determine whether an abnormality exists in T by comparing a part of T with a part of R1 and a part of R2; and determine that the abnormality exists in T based on a determination that the part of T is different from the part of R1 and the part of R2.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 3 is a diagram showing an existing method for abnormality detection in a first example periodic pattern.

FIG. 4 is a diagram showing a method for abnormality detection in the first example periodic pattern according to implementations of this disclosure.

DETAILED DESCRIPTION

Figure 1:
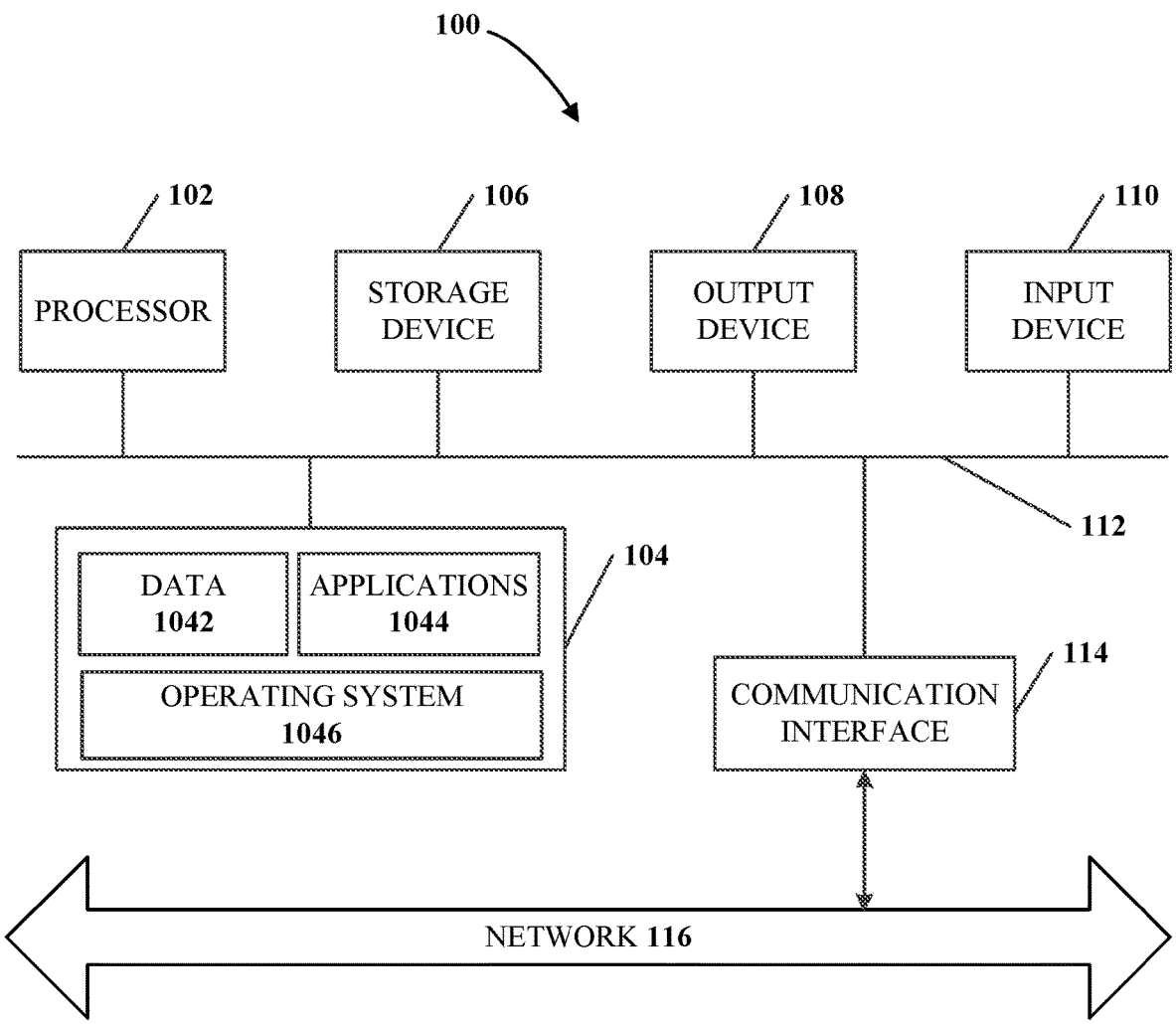
FIG. 1 is a diagram of an example apparatus for image-based abnormality detection in periodic patterns according to implementations of this disclosure.

FIG. 1 is a diagram of an example apparatus 100 for image-based abnormality detection in periodic patterns according to implementations of this disclosure. The apparatus 100 can include any number of any configurations of computing devices, such as a microcomputer, a mainframe computer, a supercomputer, a general-purpose computer, a special-purpose/dedicated computer, an integrated computer, a database computer, a remote server computer, a personal computer, or a computing service provided by a computing service provider, for example, a web host, or a cloud service provider. In some implementations, the computing devices can be implemented in the form of multiple groups of computers that are at different geographic locations and can communicate with one another, such as by a network. While certain operations can be shared by multiple computers, in some implementations, different computers can be assigned to different operations. In some implementations, the apparatus 100 can be implemented using general-purpose computers/processors with a computer program that, when executed, carries out any of the respective methods, algorithms and/or instructions described herein. In addition, for example, special-purpose computers/processors, which can contain specialized hardware for carrying out any of the methods, algorithms, or instructions described herein, can be utilized.

The apparatus 100 can have an internal configuration of hardware including a processor 102 and a memory 104. The processor 102 can be any type of device capable of manipulating or processing information. In some implementations, the processor 102 can include a central processing unit (CPU). In some implementations, the processor 102 can include a graphics processor (e.g., a graphics processing unit or GPU). For example, the GPU can provide additional graphical processing capability for at least one of periodic pattern extraction, non-periodic features removing, reference pattern generation, and image-based abnormality detection. Although the examples herein are described with a single processor as shown, advantages in speed and efficiency can be achieved using multiple processors. For example, the processor 102 can be distributed across multiple machines or devices (in some cases, each machine or device can have multiple processors) that can be coupled directly or connected to a network.

The memory 104 can be any transitory or non-transitory device capable of storing codes and data that can be accessed by the processor (e.g., via a bus). For example, the memory 104 can be accessed by the processor 102 via a bus 112. Although a single bus is shown in the apparatus 100, multiple buses can be utilized. The memory 104 herein can be a random-access memory device (RAM), a read-only memory device (ROM), an optical/magnetic disc, a hard drive, a solid-state drive, a flash drive, a security digital (SD) card, a memory stick, a compact flash (CF) card, or any combination of any suitable types of storage devices. In some implementations, the memory 104 (e.g., a network-based or cloud-based memory) can be distributed across multiple machines or devices. The memory 104 can store data 1042, an operating system 1046, and an application 1044. The data 1042 can be any data for processing (e.g., computerized data files or database records). The application 1044 can include programs that permit the processor 102 to implement instructions to perform functions described in this disclosure. For example, when the application 1044 is run, a set of algorithms, processes, or steps can be executed for periodic pattern extraction, non-periodic features removing, reference pattern generation, and image-based abnormality detection.

In some implementations, in addition to the processor 102 and the memory 104, the apparatus 100 can include a secondary (e.g., additional or external) storage device 106. The secondary storage device 106 can provide additional storage capacity for high processing needs. The secondary storage device 106 can be a storage device in the form of any suitable transitory or non-transitory computer-readable media, such as a memory card, a hard disk drive, a solid-state drive, a flash drive, or an optical drive. Further, the secondary storage device 106 can be a component of the apparatus 100 or can be a shared device that can be accessed via a network. In some implementations, the application 1044 can be stored in whole or in part in the secondary storage device 106 and loaded into the memory 104. For example, the secondary storage device 106 can be used for a database.

In some implementations, in addition to the processor 102 and the memory 104, the apparatus 100 can include an output device 108. The output device 108 can be, for example, a display coupled to the apparatus 100 for displaying graphics data. If the output device 108 is a display, for example, it can be a liquid crystal display (LCD), a cathode-ray tube (CRT) display, or any other output device capable of providing a visible output to an individual. The output device 108 can also be any device transmitting visual, acoustic, or tactile signals to a user, such as a touch-sensitive device (e.g., a touchscreen), a speaker, an earphone, a light-emitting diode (LED) indicator, or a vibration motor. In some implementations, the output device 108 can also function as an input device (e.g., a touch screen display configured to receive touch-based input). For example, the output device 108 can include a display that can display images, simulation results, simulation parameters, or a combination thereof. The output device 108 can enable a user (e.g., a mask design engineer) to assess the current status of the image-based abnormality detection in periodic patterns.

In some implementations, the output device 108 can also function as a communication device for transmitting signals and/or data. For example, the output device 108 can include a wired means for transmitting signals or data from the apparatus 100 to another device. For another example, the output device 108 can include a wireless transmitter using a protocol compatible with a wireless receiver to transmit signals from the apparatus 100 to another device.

In some implementations, in addition to the processor 102 and the memory 104, the apparatus 100 can include an input device 110. The input device 110 can be, for example, a keyboard, a numerical keypad, a mouse, a trackball, a microphone, a touch-sensitive device (e.g., a touchscreen), a sensor, or a gesture-sensitive input device. Any type of input device not requiring user intervention is also possible. For example, the input device 110 can be a communication device, such as a wireless receiver operating according to any wireless protocol for receiving signals. The input device 110 can output signals or data, indicative of the inputs, to the apparatus 100, for example, via the bus 112. For example, a user or operator can provide simulation-related information to the apparatus 100 via the input device 110. For another example, the input device 110 can also be an interface (e.g., a scanner) that can enable a user to provide images to the apparatus 100 related to the design pattern of the mask.

In some implementations, in addition to the processor 102 and the memory 104, the apparatus 100 can optionally include a communication device 114 to communicate with another device. Optionally, the communication can occur via a network 116. The network 116 can include one or more communications networks of any suitable type in any combination, including, but not limited to, Bluetooth networks, infrared connections, near-field connections (NFC), wireless networks, wired networks, local area networks (LAN), wide area networks (WAN), virtual private networks (VPN), cellular data networks, or the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that can communicate with the network 116. For example, remote control instructions can be received by the communication device 114 from another computing device connected to the network 116 for remote control of the apparatus 100.

The apparatus 100 (and algorithms, methods, instructions, etc., stored thereon and/or executed thereby) can be implemented as hardware modules, such as, for example, intellectual property (IP) cores, application-specific integrated circuits (ASICs), programmable logic arrays, optical processors, programmable logic controllers, microcode, firmware, microcontrollers, servers, microprocessors, digital signal processors, or any other suitable circuit. Further, portions of the apparatus 100 do not necessarily have to be implemented in the same manner.

Figure 2A:
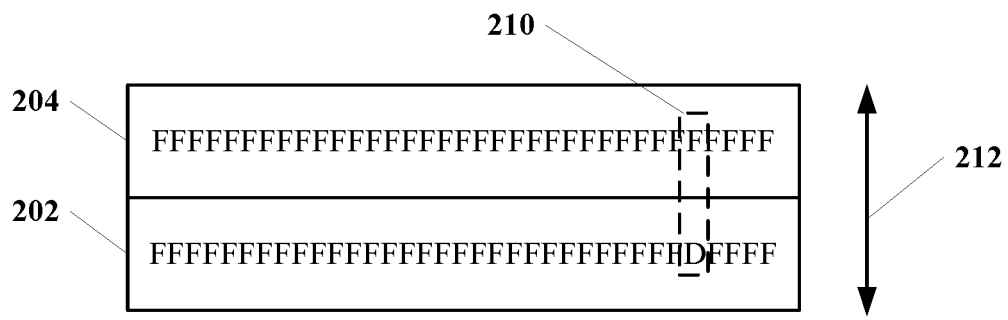
FIGS. 2A-2C are diagrams showing an example periodic segment in a periodic pattern and reference segments for abnormality detection in the example periodic segment.
Figure 2B:
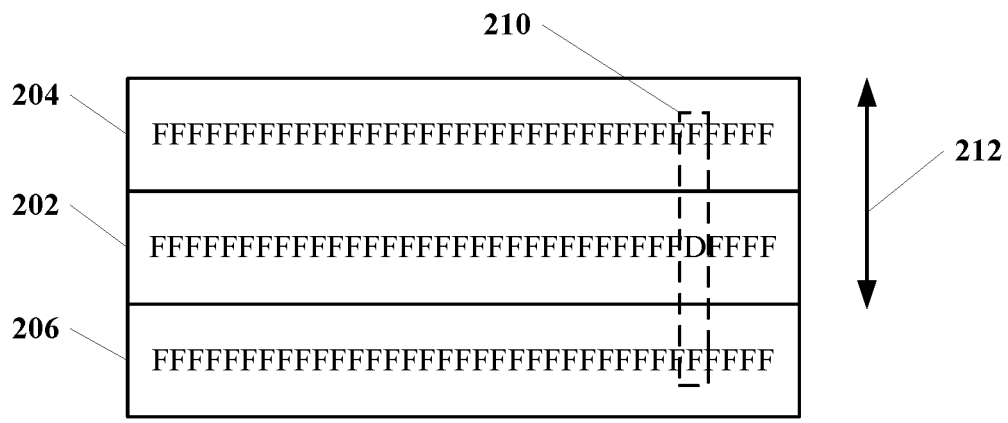
Figure 2C:
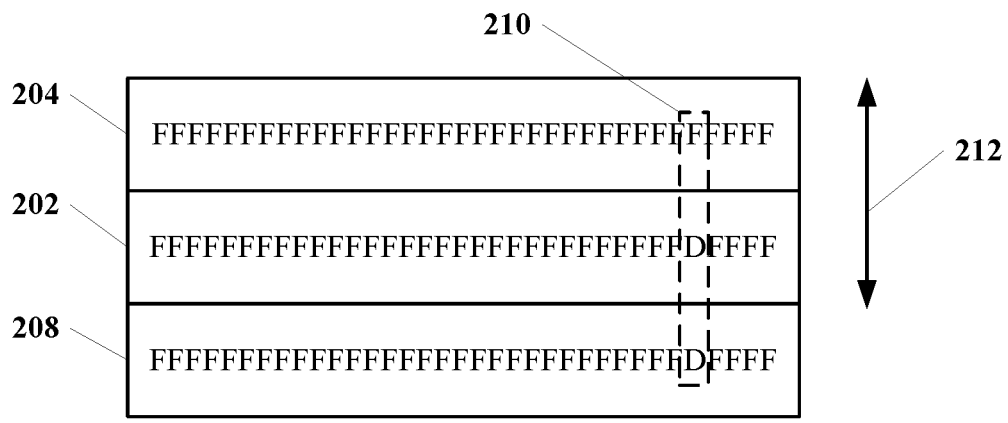

FIGS. 2A-2C are diagrams showing an example periodic segment 202 in a periodic pattern (not fully shown) and reference segments 202-208 for abnormality detection in the example periodic segment. In FIGS. 2A-2C, the periodic pattern can include repeating periodic segments along a spatial direction 202. In FIGS. 2A-6, symbols "F" and "D" represent image features in periodic segments. The symbol "F" can represent a target feature or a non-target repeated feature (e.g., a noise-caused feature). The symbol "D" can represent an abnormality, which can be deemed as a candidate defect. By detecting and processing the abnormality, whether the abnormality is an actual defect or a false identification can be determined.

In FIG. 2A, the periodic segment 202 is compared with the reference segment 204 to detect abnormalities, and a difference at a location 210 is detected between the periodic segment 202 and the reference segment 204. It should be noted that, in FIG. 2A, it is uncertain whether the detected difference at the location 210 of the periodic segment 202 indicates a target feature or an abnormality. For example, "D" at the location 210 can indicate a target feature and "F" at the location 210 can indicate an actual defect. In other words, for a two-segment comparison, it can be difficult to determine whether a difference in features of the periodic segment 202 is an abnormality.

In FIG. 2B, the periodic segment 202 is compared with the reference segments 204 and 206. It can be seen that, at the location 210, only the periodic segment 202 shows "D" while the reference segments 204 and 206 show "F." It can be determined that there is a higher probability than in FIG. 2A that the periodic segment 202 includes an abnormality at the location 210. In other words, for a multi-segment comparison, it can be easier to determine whether a difference in features is an abnormality than in a two-segment comparison.

However, even for a multi-segment comparison, in some scenarios, it is still difficult to determine whether a difference in features is an abnormality. For example, in FIG. 2C, the periodic segment 202 is compared with the reference segments 204 and 208. It can be seen that at the location 210, the periodic segment 202 and the reference segment 208 show "D" while the reference segment 204 shows "F." The inconsistent reference segments 204 and 208 render whether a difference in features of the periodic segment 202 is an abnormality as uncertain to determine.

One way to deal with the aforementioned difficulty is to use contiguous segments of the periodic segment 202 in the same periodic pattern as reference segments for comparison. An inspection image can be obtained from a data acquisition system (DAQ). Because the DAQ can introduce noise, drifts, or other systematic uncertainties, contiguous segments in the periodic pattern can have consistent systematic errors (e.g., similar noise patterns, similar drift patterns, etc.) because they are generated temporally and spatially close-by. In other words, contiguous segments can be more consistent with each other, and if they can be used as the reference segments, the probability of uncertainties arising in FIG. 2C and the probability of false identification of abnormalities can be reduced.

For example, when an image including patterns is captured by an inspection device, abnormalities on the image can be identified. If the patterns are non-repeating, an outside reference image can be use for comparison with the image to detect the abnormalities (e.g., using an RMS-error based image comparison technique). If the pattern on the image is periodic, usage of the outside reference image can be waived. It should be noted that image comparison techniques for identifying the abnormalities on the image of periodic patterns are not limited in this disclosure.

FIG. 3 is a diagram showing an existing method for abnormality detection in an example periodic pattern 302. The periodic pattern 302 includes six periodic segments P1-P6. The method can be used to generate reference patterns 304 and 306 based on shifting the periodic pattern 302, and thus can be referred to as a "shift-based method." For example, the periodic pattern 302 can be duplicated as the reference patterns 304 and 306 that are shifted with respect to the periodic pattern 302. In FIG. 3, the reference pattern 304 is down-shifted by one period (e.g., one periodic segment), and the reference pattern 306 is up-shifted by one period. An overlap portion 308 (shown as a dashed box) between the periodic pattern 302 and the reference patterns 304 and 306 can be used to detect abnormalities in the periodic pattern 302. The overlap portion 308 includes four periods (e.g., covering four periodic segments). For simplicity, a periodic segment X in the periodic pattern Y can be referred to as "Y:X" hereinafter. For example, 302:P2 can be compared with 304:P1 and 306:P3. 304:P1 and 306:P3 are duplicates of 302:P1 and 302:P3, respectively. That is, 302:P2 is compared with its contiguous segments 302:P1 and 302:P3. For simplicity, a comparison between segments can be represented by "{Y1:X1|Y2:X2, . . . , Yn:Xn}" hereinafter, in which Y1, Y2, Yn represents the periodic patterns or their parts that include the periodic segments X1, X2, . . . , Xn, and Y1:X1 represents the periodic segment in which abnormalities are sought for. For example, {302:P2|304:P1, 306:P3} can be used to detect abnormalities in 302:P2. 302:P3 through 302:P5 can be compared with corresponding segments in the same way (e.g., by comparing {302:P3|304:P2, 306:P4}, {302:P4|304:P3, 306:P5}, and {302:P5|304:P4, 306:P6}).

In the shift-based method as shown in FIG. 3, at least two reference patterns can be determined from a provided periodic pattern with a limited length. By using the at least two reference patterns, abnormality detection in the provided periodic pattern can obtain a higher probable result.

However, one challenge of the shift-based method is that it cannot be used to detect abnormalities in the top and bottom portions of the provided periodic pattern. For example, in FIG. 3, 302:P1 has no corresponding segment in the reference pattern 304, and 302:P6 has no corresponding segment in the reference pattern 306. Because of insufficient reference segments for comparison (e.g., similar to situations shown in FIG. 2A), highly probable detection results are difficult to obtain.

FIG. 4 is a diagram showing a method for abnormality detection in an example periodic pattern 402 according to implementations of this disclosure. The periodic pattern 402 also includes six periodic segments P1-P6. The method can be used to generate reference patterns 404 and 406 based on rearranging or reordering periodic segments of the periodic pattern 402, and thus can be referred to as a "rearrangement-based method." In FIG. 4, the reference pattern 404 can be generated by the following operations. A first consecutive part of the periodic pattern 402 (e.g., 402:P2 through 402:P4) is duplicated, in which the first periodic segment of the periodic pattern 402, 402:P1, is skipped. The duplicated 402:P2 through 402:P4 form a first part 408 of the reference pattern 404, which includes 408:P2 through 408:P4 (as shown by the long-dash arrows in FIG. 4). A second consecutive part of the periodic pattern 402 (e.g., 402:P3 through 402:P5) is duplicated, in which the last periodic segment of the periodic pattern 402, 402:P6, is skipped. The duplicated 402:P3 through 402:P5 form a second part 410 of the reference pattern 404, which includes 410:P3 through 410:P5 (as shown by the short-dash arrows in FIG. 4).

The reference pattern 406 can be generated by the following operations. A third consecutive part of the periodic pattern 402 (e.g., 402:P3 through 402:P5) is duplicated, in which the first two periodic segments of the periodic pattern 402, 402:P1 and 402:P2, are skipped. The duplicated 402:P3 through 402:P5 form a third part 412 of the reference pattern 406, which includes 412:P3 through 412:P5 (as shown by the dotted arrows in FIG. 4). A fourth consecutive part of the periodic pattern 402 (e.g., 402:P2 through 402:P4) is duplicated, in which the last two periodic segments of the periodic pattern 402, 402:P5 and 402:P6, are skipped. The duplicated 402:P2 through 402:P4 form a fourth part 414 of the reference pattern 406, which includes 414:P2 through 414:P4 (as shown by the dot-dash arrows in FIG. 4).

In FIG. 4, the first part 408, consecutive periodic segments 402:P1 through 402:P3, and the third part 412 can be compared to detect abnormalities in 402:P1 through 402:P3. For example, {402:P1|408:P2, 412:P3} can be used to detect abnormalities in 402:P1, and {402:P2|408:P3, 412:P4} can be used to detect abnormalities in 402:P2. Similarly, the second part 410, consecutive periodic segments 402:P4 through 402:P5, and the fourth part 414 can be compared to detect abnormalities in 402:P4 through 402:P6. For example, {402:P4|410:P3, 414:P2} can be used to detect abnormalities in 402:P4, and {402:P6|410:P5, 414:P4} can be used to detect abnormalities in 402:P6.

It should be noted that in the rearrangement-based method as shown in FIG. 4, the entire provided periodic pattern can be processed to detect abnormalities, and no periodic segment (e.g., the top and/or bottom portions) is left out from the detection. Meanwhile, each periodic segment of the provided periodic pattern can be compared with its contiguous segments (e.g., see the above description and FIG. 4). Compared with the shift-based method, the rearrangement-based method can fully utilize the collected data and the inspection system, thus increases the efficiency of the abnormality detection.

Figure 5:
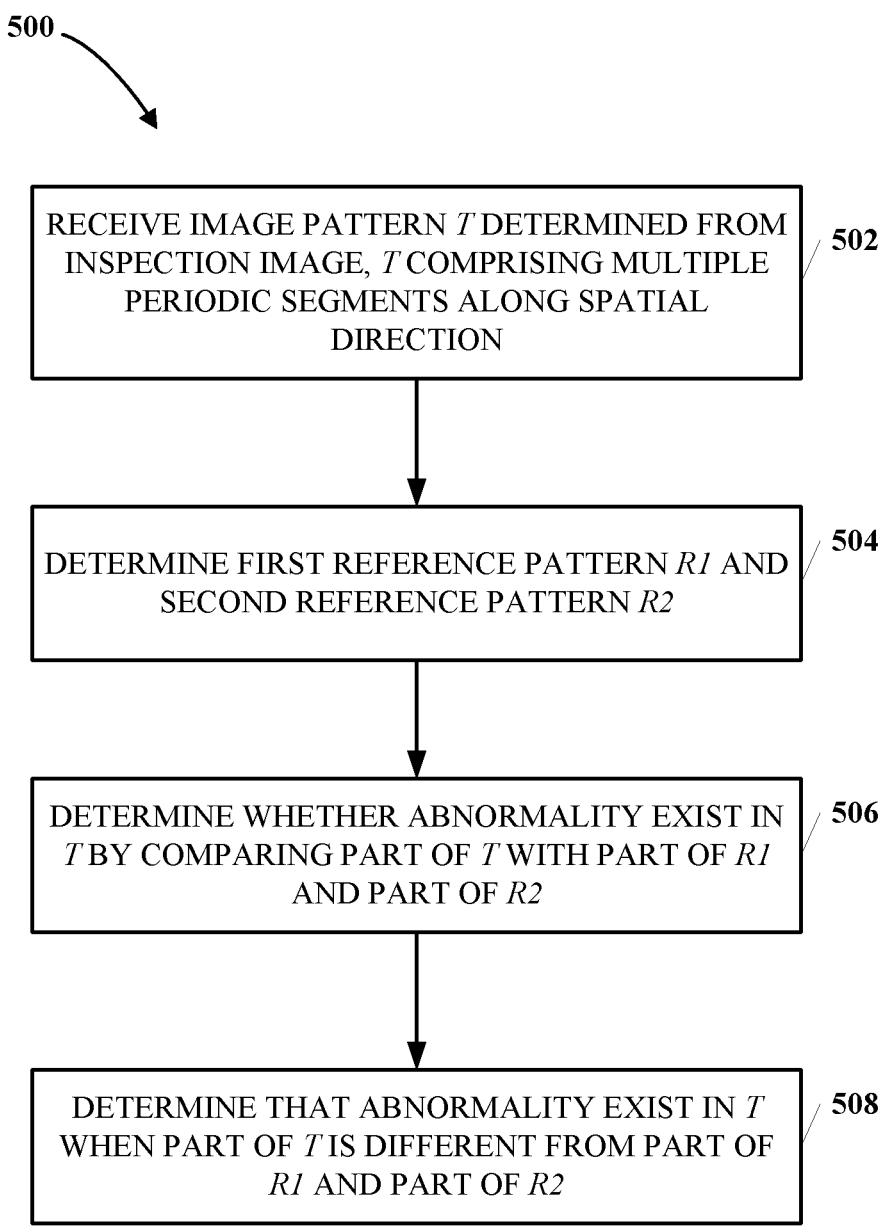
FIG. 5 is a flowchart of an example process of image-based abnormality detection according to implementations of this disclosure.

FIG. 5 is a flowchart of an example process 500 of image-based abnormality detection according to implementations of this disclosure. The process 500 can be implemented in hardware or software. For example, the process 500 can be implemented in software stored as instructions and/or data in the memory 104 and executable by the processor 102 of the apparatus 100. For another example, the process 500 can be implemented in hardware as a specialized chip storing instructions executable by itself.

At operation 502, an image pattern T determined from an inspection image is received. T includes multiple periodic segments along a spatial direction. For example, the multiple periodic segments can be arranged consecutively along the spatial direction, and each of them can be indexed along the spatial direction (e.g., indexed as $1^{st}$, $2^{nd}$, $3^{rd}$, ... $n^{th}$). In some implementation, the inspection image can include a wafer inspection image or a mask inspection image. In some implementations, the inspection image can be determined from (e.g., as outputs of) an optical inspection apparatus or an e-beam inspection apparatus. T can be whole or part of the inspection image. For example, the inspection image can be segmented into multiple samples, and each sample can form an image pattern for abnormality detection.

In some implementations, the spatial direction can be a linear spatial direction (e.g., along x- or y-direction). In some implementations, the spatial direction can be a non-linear spatial direction (e.g., a circular direction, a spiral direction, a curvy direction, a zig-zag direction, or any other non-linear spatial direction). It should be noted that the process is not limited to be applicable for periodic segments arranged along a linear spatial direction but can be applicable for periodic segments arranged along any spatial direction.

At operation 504, a first reference pattern R1 and a second reference pattern R2 are determined (e.g., by the processor 102). R1 is determined by rearranging the multiple periodic segments of T in a first manner, and R2 is determined by rearranging the multiple periodic segments of T in a second manner.

In some implementations, R1 and R2 can include the same number of segments with T indexed along the spatial direction. R1 can include a first part duplicated from first consecutive periodic segments of T and a second part duplicated from second consecutive periodic segments of T. R2 can include a third part duplicated from third consecutive periodic segments of T and a fourth part duplicated from fourth consecutive periodic segments of T. The first, second, third, and fourth consecutive periodic segments can be different periodic segments of T. In some implementations, any two of the first, second, third, and fourth consecutive periodic segments are different in the compositions of the periodic segments.

For example, T can include n (n is an integer greater than 1) periodic segments. In some implementations, n can be greater than or equal to 4. R1 and R2 can also include n periodic segments. For example, as shown in FIG. 4, T can be the periodic pattern 402, and R1 and R2 can be the reference patterns 404 and 406, respectively. In FIG. 4, each of T, R1, and R2 includes 6 periodic segments (i.e., n=6).

In some implementations, the first consecutive periodic segments can include $n_1$ ($n_1$ is a positive integer) consecutive periodic segments of T but not the first periodic segment of T. The second consecutive periodic segments can include $(n-n_1)$ consecutive periodic segments of T but not the last periodic segment of T. The third consecutive periodic segments can include $n_2$ ($n_2$ is a positive integer) consecutive periodic segments of T but not the first two periodic segments of T. The fourth consecutive periodic segments can include $(n-n_2)$ consecutive periodic segments of T but not the last two periodic segments of T.

For example, in FIG. 4, the first consecutive period segments can include 402:P2 through 402:P4, which includes 3 consecutive periodic segments (i.e., $n_1$=3). The first consecutive period segments do not include the first periodic segment of T, 402:P1. The second consecutive period segments can include 402:P3 through 402:P5, which includes 3 consecutive periodic segments (i.e., n−n$_1$=3). The second consecutive period segments do not include the last periodic segment of T, 402:P6. The third consecutive period segments can include 402:P3 through 402:P5, which includes 3 consecutive periodic segments (i.e., n$_2$=3). The third consecutive period segments do not include the first two periodic segments of T, 402:P1 and 402:P2. The fourth consecutive period segments can include 402:P2 through 402:P4, which includes 3 consecutive periodic segments (i.e., n−n$_2$=3). The fourth consecutive period segments do not include the last two periodic segments of T, 402:P5 and 402:P6.

In some implementations, the first consecutive periodic segments can include the $(m_1+1)^{th}$ periodic segment through the $(m_1+n_1)^{th}$ periodic segment of T, in which $m_1$ is a positive integer. $m_1$ can be smaller than or equal to $n_1$. $n_1$ can be smaller than or equal to $(n-m_1)$. That is, to determine the first consecutive periodic segments, the first $m_1$ periodic segments of T are skipped. The second consecutive periodic segments can include the $(n_1-m_1+1)^{th}$ periodic segment through the $(n-m_1)^{th}$ periodic segment of T. That is, to determine the second consecutive periodic segments, the last $m_1$ periodic segments of T are skipped. The third consecutive periodic segments can include the $(m_2+1)^{th}$ periodic segment through the $(m_2+n_2)^{th}$ periodic segment of T, in which $m_2$ is a positive integer. $m_2$ is different from $m_1$ and can be smaller than or equal to $n_2$. $n_2$ can be smaller than or equal to $(n-m_2)$. That is, to determine the third consecutive periodic segments, the first $m_2$ periodic segments of T are skipped. The fourth consecutive periodic segments can include the $(n_2-m_2+1)^{th}$ periodic segment through the $(n-m_2)^{th}$ periodic segment of T. That is, to determine the fourth consecutive periodic segments, the last $m_2$ periodic segments of T are skipped.

Figure 6:
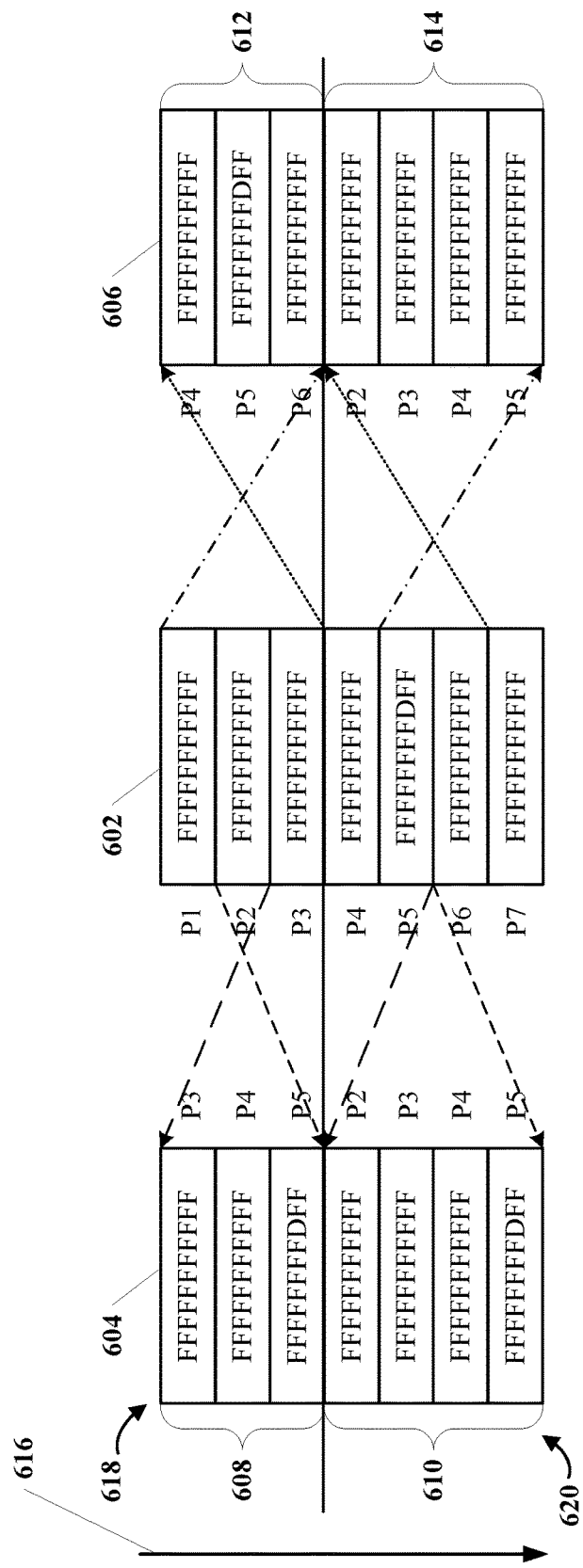
FIG. 6 is a diagram showing the method for abnormality detection in a second example periodic pattern.

The above implementations can be shown in FIG. 6 as an example. FIG. 6 is a diagram showing the method for abnormality detection in an example periodic pattern 602. Two reference patterns 604 and 606 are generated in accordance with the operation 504. In FIG. 6, T can be the periodic pattern 602, and R1 and R2 can be the reference patterns 604 and 606, respectively. In FIG. 6, each of T, R1, and R2 includes 7 periodic segments (i.e., n=7). The seven periodic segments of T are labeled as P1-P7. Along a spatial direction 616, the segments of each of T, R1, and R2 can be indexed as $1^{st}$, $2^{nd}$, $3^{rd}$, . . . , $7^{th}$, respectively.

In FIG. 6, the reference pattern 604 (i.e., R1) is generated under a condition of $n_1$=3 and $m_1$=2. A first part 608 of R1 is generated by duplicating first consecutive period segments of T, the $3^{rd}$ ($m_1$+1=3) periodic segment 602:P3 through the $5^{th}$ ($m_1+n_1$=5) periodic segment 602:P5, which is shown by the long-dash arrows in FIG. 6. The first consecutive period segments do not include the first two ($m_1$=2) periodic segment of T, 602:P1 and 602:P2. A second part 610 of R1 is generated by duplicating second consecutive period segments of T, the $2^{nd}$ ($n_1-m_1$+1=2) periodic segment 602:P2 through the $5^{th}$ ($n-m_1$=5) periodic segment 602:P5, which is shown by the short-dash arrows in FIG. 6. The second consecutive period segments do not include the last two ($m_1$=2) periodic segment of T, 602:P6 through 602:P7.

The reference pattern 606 (i.e., R2) is generated under a condition of $n_2$=3 and $m_2$=3. A third part 612 of R2 is generated by duplicating third consecutive period segments of T, the $4^{th}$ ($m_2$+1=4) periodic segment 602:P4 through the $6^{th}$ ($m_2+n_2$=6) periodic segment 602:P7, which is shown by the dotted arrows in FIG. 6. The third consecutive period segments do not include the first three ($m_2$=3) periodic segment of T, 602:P1 and 602:P3. A fourth part 614 of R2 is generated by duplicating fourth consecutive period segments of T, the $1^{st}$ ($n_2-m_2$+1=1) periodic segment 602:P2 through the $4^{th}$ ($n-m_2$=4) periodic segment 602:P4, which is shown by the dot-dash arrows in FIG. 6. The fourth consecutive period segments do not include the last three ($m_2$=3) periodic segment of T, 602:P5 through 602:P7.

It should be noted that, the values of n, $n_1$, $n_2$, $m_1$, and $m_2$ are not limited to the values in the examples as shown in FIGS. 4 and 6, and can be any integer, as long as:

$$1 \leq m_1 \leq n_1 \leq n-m_1$$

$$1 \leq m_2 \leq n_2 \leq n-m_2$$

In FIGS. 4 and 6, it can be shown that the reference patterns generated by the operation 504 can be compared with the entire provided periodic pattern (e.g., the periodic pattern 402 or 602). Each periodic segment of the provided periodic pattern can be compared with its contiguous segments. For example, in FIG. 6, a comparison {602:P1|608:P3, 612:P4} can be used to detect abnormalities in 602:P1. It should also be noted that the segments of R1 and R2 used to be compared with each periodic segment of T are within certain distances of the periodic segment of T. The distances are controlled by the parameters $m_1$ and $m_2$. For example, in the comparison {602:P1|608:P3, 612:P4}, 608:P3 (i.e., duplicated 602:P3) is the second ($m_1$=2) closest periodic segment of 602:P1, and 612:P4 (i.e., duplicated 602:P4) is the third ($m_2$=3) closest periodic segment of 602:P1. For another example, in the comparison {602:P4|610:P2, 612:P7}, 610:P2 (i.e., duplicated 602:P2) is the second ($m_1$=2) closest periodic segment of 602:P4, and 612:P7 (i.e., duplicated 602:P7) is the third ($m_2$=3) closest periodic segment of 602:P4. It should also be noted that, to avoid comparing a periodic segment with segments far away from it, $m_1$ and $m_2$ can be selected as small numbers (e.g., 1, 2, 3, 4, or any small number that is suitable in accordance with actual situations).

In some implementations, $n_1$ can be equal to $n_2$. In such cases, the first part of R1 and the third part of R2 can have the same number (e.g., $n_1$) of segments, and the second part of R1 and the fourth part of R2 can have the same number (e.g., $n-n_1$) of segments. For example, in FIG. 4, $n_1=n_2$=3, in which the first part 408 and the third part 412 have the same number of segments, and the second part 410 and the fourth part 414 have the same number of segments. In FIG. 6, $n_1=n_2$=3, in which the first part 608 and the third part 612 have the same number (i.e., 3) of segments, and the second part 610 and the fourth part 614 have the same number (i.e., 4) of segments.

In some implementations, T is not strictly periodic. For example, each periodic segment of T can include a non-periodic feature (e.g., a unique serial number). In those cases, the non-periodic features can be removed from T to determine the multiple periodic segments before determining R1 and R2. For example, if locations of the non-periodic features are known, image contents within those locations can be cleared to remove the non-periodic features.

Referring back to FIG. 5, at operation 506, it is determined whether an abnormality exists in T by comparing a part of T with a part of R1 and a part of R2. Each of the part of T (e.g., 402:P1 through 402:P3 in FIG. 4), the part of R1 (e.g., the first part 408 in FIG. 4), and the part of R2 (e.g., the third part 412 in FIG. 4) can include the same number of segments. Such a comparison can be referred to as an "examination unit" herein. The part of T can be compared as a whole part with the part of R1 and the part of R2. In some implementations, the part of T, the part of R1, and the part of R2 can align at the same location along the spatial direction. For example, the first segment of T can align with the first segment of the first part of R1 and the first segment of the third part of R2. The last segment of T can align with the last segment of the second part of R1 and the last segment of the fourth part of R2. That is, T, R1, and R2 can be seen as aligning end to end (or "head to tail") for comparison. Such alignment can be non-visualized (e.g., implemented as operations performed in the memory 104 on data included in the data 1042).

For example, in FIG. 4, n=6 and $n_1=n_2=3$, a first examination unit 416 includes the first part 408 of R1, the third part 412 of R2, and the first $n_1$ (i.e., 3) periodic segment of T (i.e., 402:P1 through 402:P3). When performing the comparison for the first examination unit, 402:P1 through 402:P3 of T is compared with the first part 408 and the third part 412 as a whole. That is, the comparison is not performed segment by segment. A second examination unit 418 includes the second part 410 of R1, the fourth part 414 of R2, and the last $(n-n_1)$ (i.e., 3) periodic segment of T (402:P4 through 402:P6). When performing the comparison for the second examination unit, 402:P4 through 402:P6 of T are compared with the second part 410 and the fourth part 414 as a whole.

For another example, in FIG. 6, n=7 and $n_1=n_2=3$, a first examination unit 618 includes the first part 608 of R1, the third part 612 of R2, and the first $n_1$ (i.e., 3) periodic segment of T (i.e., 602:P1 through 602:P3). When performing the comparison for the first examination unit, 602:P1 through 602:P3 of T is compared with the first part 608 and the third part 612 as a whole. That is, the comparison is not performed segment by segment. A second examination unit 620 includes the second part 610 of R1, the fourth part 614 of R2, and the last $(n-n_1)$ (i.e., 4) periodic segment of T (602:P4 through 602:P7). When performing the comparison for the second examination unit, 602:P4 through 602:P7 of T are compared with the second part 610 and the fourth part 614 as a whole.

At the operation 506, in some implementations, the part of T, the part of R1, and the part of R2 can align at the same location along the spatial direction by aligning the end segments of them. For example, in FIG. 6, the first segment of T 602:P1 can align with the first segment of the first part of R1 608:P3 and the first segment of the third part of R2 612:P4 at the same location along the spatial direction 616 (e.g., having the same spatial coordinate at an axis along the spatial direction 616). For another example, the last segment of T 602:P7 can align with the last segment of the second part of R1 610:P5 and the last segment of the fourth part of R2 614:P4 at the same location along the spatial direction 616.

It should be noted that the term "align" as used herein is not limited to a visualized alignment but can also refer to a non-visualized alignment. For example, the non-visualized alignment can be implemented as establishing a corresponding relationship between the parts of a reference pattern (e.g., R1 or R2) and the image pattern (e.g., T), in which the corresponding relationship can be used to determine what parts of the reference patterns and the image pattern would be used for comparison. For example, the corresponding relationship can be stored as any form of data included in the data 1042 in FIG. 1.

When performing comparisons for examination units, parts of T, R1, and R2 can be kept separate. For example, in FIG. 6, when performing comparisons for the examination units 618 and 620, the first part and second part of R1 can be kept separated (i.e., not merged), and the third part and fourth part of R2 can be kept separated. The separate parts can be non-visualized (e.g., implemented as separate groups of data stored included in the data 1042 in FIG. 1). In some implementations, $n_1$ can be equal to one half of n when n is an even number.

In some implementations, different parts (e.g., the first part 608 and second part 610) of a reference pattern (e.g., the reference pattern 604) can be merged before being compared with T (e.g., the periodic pattern 602). The parts of a reference pattern can be merged to generate the reference pattern as a whole, before comparing it with the provided periodic pattern. A whole reference pattern can be non-visualized (e.g., implemented as a single group of data included in the data 1042). Image merging techniques can be used to reduce the merging inaccuracies when merging the parts. For example, in FIG. 6, the first part 608 can be merged with the second part 610 to form the reference pattern 604 as a whole. The third part 612 can be merged with the fourth part 614 to form the reference pattern 606 as a whole. After merging, the periodic pattern 602 can be compared with the reference pattern 604 as a whole and compared with the reference pattern 606 as a whole. However, one challenge is that merging inaccuracies can occur at the border of the two parts (e.g., between 608:P5 and 610:P2).

In some implementations, to increase detection speed, the comparison can be performed once an examination unit can be generated. For example, in FIG. 6, assuming that the segments of T are generated from inspection along the spatial direction 616 (i.e., 602:P2 is generated after 602:P1, 602:P3 is generated after 602:P2, and so on), and that segments 602:P1 through 602:P3 have already been examined previously (e.g., included in previously-generated examination units that are different from the examination unit 618). Once segments 602:P4 through 602:P7 are generated from inspection, examination unit 620 can be formed accordingly for comparison. In this manner, examination unit can be generated continuously as the inspection goes on, and the detection of abnormality can be performed without interrupting the inspection process, thereby increasing the detection speed.

Referring back to FIG. 5, at operation 508, if the part of T is different from the part of R1 and the part of R2, an abnormality can be determined to exist in T. For example, in FIG. 6, after comparing T with R1 and R2 (e.g., by compare the examination unit 620), 602:P5 can be found to be different from 610:P3 and 614:P2, and an abnormality can be determined to exist in T.

It should be noted that the disclosed methods, apparatuses, and systems, such as the process 500, are not limited to be applicable to one-dimensional periodic patterns. They can be applicable to multidimensional periodic patterns (e.g., a 2D pattern periodically repeated in x- and y-directions). For a multidimensional periodic pattern, each dimension can be processed separately using the disclosed methods, apparatuses, and systems. That is, the process of abnormality detection for a multidimensional periodic pattern can be equated to multiple processes of abnormality detection for multiple one-dimensional periodic patterns, each of which is one dimension of the multidimensional periodic pattern.

It should also be noted that the disclosed methods, apparatuses, and systems, such as the process 500, can be applicable to scenarios of detecting any abnormality in any kind of periodic image patterns, such as, for example, manufactured semiconductor devices, printed materials (e.g., currency notes, articles, tickets, or ledgers), or exterior appearance of products monitored on a production line. As long as an image can be obtained and periodic patterns can be extracted therefrom, the methods, apparatuses, and systems disclosed herein can be used to detect abnormalities in the periodic patterns.

As described above, it should be noted that all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

The implementations of apparatuses as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing, either singly or in combination. The terms "signal" and "data" are used interchangeably. Further, portions of the apparatuses do not necessarily have to be implemented in the same manner.

The aspects of the disclosure described herein can be described in terms of functional block components and various processing operations. The disclosed processes and sequences can be performed individually or in any combination. Functional blocks can be realized by any number of hardware and/or software components that perform the specified functions. For example, the described aspects can employ various integrated circuit components (e.g., memory elements, processing elements, logic elements, look-up tables, and the like), which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device, such as a hard disk drive, a memory device, a solid-state drive, a flash drive, or an optical drive. Other suitable mediums are also available. Such computer-usable or computer-readable media can be referred to as non-transitory memory or media. Unless otherwise specified, a memory of an apparatus described herein does not have to be physically contained in the apparatus but can be a memory that can be accessed remotely by the apparatus and does not have to be contiguous with other memory that might be physically contained by the apparatus.

Any of the individual or combined functions described herein as being performed as examples of the disclosure can be implemented using machine-readable instructions in the form of code for the operation of any or any combination of the aforementioned computational hardware. The computational code can be implemented in the form of one or more modules by which individual or combined functions can be performed as a computational tool, the input and output data of each module being passed to/from one or more further modules during operation of the methods, apparatuses, and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, electronics, control systems, software development, and other functional aspects of the systems (and components of the individual operating components of the systems) cannot be described in detail herein. Furthermore, the connecting lines or connectors shown in the various figures presented are intended to represent exemplary functional relationships and/or physical or logical couplings between the various elements. Many alternative or additional functional relationships, physical connections, or logical connections can be present in a practical device.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this disclosure, the term "or" is intended to mean an inclusive "or" rather than an exclusive "or" for the two or more elements it conjoins. That is, unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A and/or B" is satisfied under any of the foregoing instances. Similarly, "X includes at least one of A, B, and C" is intended to be used as an equivalent of "X includes A, B, and/or C." In addition, the articles "a" and "an" as used in this application and the appended claims should generally be construed to mean "one or more" unless specified otherwise or clear from context to be directed to a singular form. Moreover, use of the term "an aspect" or "one aspect" throughout this disclosure is not intended to mean the same aspect or implementation unless described as such.

As used herein, the term "receive" can refer to receiving, inputting, acquiring, retrieving, obtaining, reading, accessing, collecting, or any action for inputting information or data in any manner. The use of "including" or "having" and variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein is merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by the context. The use of any and all examples, or exemplary language (e.g., "such as") provided herein, is intended merely to better illuminate the disclosure and does not pose a limitation on the scope of the disclosure unless otherwise claimed.

It should be understood that although this disclosure uses terms such as first, second, third, etc., the disclosure should not be limited to these terms. These terms are used only to distinguish similar types of information from each other. For example, without departing from the scope of this disclosure, a first information can also be referred to as a second information; and similarly, a second information can also be referred to as a first information. Depending on the context, the word "if" as used herein can be interpreted as "when," "while," or "in response to."

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of image-based abnormality detection for periodic patterns, comprising:
    receiving an image pattern T determined from an inspection image, wherein T comprises multiple periodic segments along a spatial direction;
    determining, by a processor, a first reference pattern R1 by rearranging the multiple periodic segments of T in a first manner and a second reference pattern R2 by rearranging the multiple periodic segments of T in a second manner;
    determining whether an abnormality exists in T by comparing a part of T with a part of R1 and a part of R2; and
    determining that the abnormality exists in T based on a determination that the part of T is different from the part of R1 and the part of R2.

2. The method of claim 1, wherein
    R1 and R2 comprise the same number of segments with T,
    R1 comprises a first part duplicated from first consecutive periodic segments of T and a second part duplicated from second consecutive periodic segments of T,
    R2 comprises a third part duplicated from third consecutive periodic segments of T and a fourth part duplicated from fourth consecutive periodic segments of T, and
    the first consecutive periodic segments, the second consecutive periodic segments, the third consecutive periodic segments, and the fourth consecutive periodic segments are different periodic segments of T.

3. The method of claim 2, wherein the first segment of T aligns with the first segment of the first part of R1 and the first segment of the third part of R2, and the last segment of T aligns with the last segment of the second part of R1 and the last segment of the fourth part of R2.

4. The method of claim 2, wherein T comprises n periodic segments, n being an integer greater than 1,
    the first consecutive periodic segments comprise $n_1$ consecutive periodic segments of T not including the first periodic segment of T, $n_1$ being a positive integer, the second consecutive periodic segments comprise $(n-n_1)$ consecutive periodic segments of T not including the last periodic segment of T,
    the third consecutive periodic segments comprise $n_2$ consecutive periodic segments of T not including the first two periodic segments of T, $n_2$ being a positive integer, and
    the fourth consecutive periodic segments comprise $(n-n_2)$ consecutive periodic segments of T not including the last two periodic segments of T.

5. The method of claim 4, wherein the first consecutive periodic segments comprise the $(m_1+1)^{th}$ periodic segment through the $(m_1+n_1)^{th}$ periodic segment of T, $m_1$ being a positive integer smaller than or equal to $n_1$, $n_1$ being smaller than or equal to $(n-m_1)$,
    the second consecutive periodic segments comprise the $(n_1-m_1+n)^{th}$ periodic segment through the $(n-m_1)^{th}$ periodic segment of T,
    the third consecutive periodic segments comprise the $(m_2+1)^{th}$ periodic segment through the $(m_2+n_2)^{th}$ periodic segment of T, $m_2$ being a positive integer smaller than or equal to $n_2$ and different from $m_1$, $n_2$ being smaller than or equal to $(n-m_2)$, and
    the fourth consecutive periodic segments comprise the $(n_2-m_2+n)^{th}$ periodic segment through the $(n-m_2)^{th}$ periodic segment of T.

6. The method of claim 5, wherein comparing the part of T with the part of R1 and the part of R2 comprises:
    comparing a first part of T with the first part of R1 and the third part of R2, wherein the first part of T comprises the first $n_1$ periodic segment of T; and
    comparing a second part of T with the second part of R1 and the fourth part of R2, wherein the second part of T comprises the last $(n-n_1)$ periodic segment of T.

7. The method of claim 6, wherein $n_1$ is equal to $n_2$.

8. The method of claim 7, wherein $n_1$ is equal to one half of n when n is an even number.

9. The method of claim 1, further comprising:
    prior to determining the first reference pattern R1 by rearranging the multiple periodic segments of T in the first manner and the second reference pattern R2 by rearranging the multiple periodic segments of T in the second manner, removing non-periodic features from T to determine the multiple periodic segments.

10. The method of claim 1, wherein
the inspection image comprises one of a wafer inspection image and a mask inspection image,
the inspection image is determined from one of an optical inspection apparatus and an electron-beam inspection apparatus, and
the spatial direction comprises a linear spatial direction.

11. An apparatus of image-based abnormality detection for periodic patterns, comprising:
a processor; and
a memory coupled to the processor, the memory configured to store instructions which when executed by the processor become operational with the processor to:
receive an image pattern T determined from an inspection image, wherein T comprises multiple periodic segments along a spatial direction;
determine a first reference pattern R1 by rearranging the multiple periodic segments of T in a first manner and a second reference pattern R2 by rearranging the multiple periodic segments of T in a second manner; and
determine that an abnormality exists in T based on a determination that a part of T is different from a part of R1 and a part of R2, after comparing the part of T with the part of R1 and the part of R2.

12. The apparatus of claim 11, wherein
R1 and R2 comprise the same number of segments with T,
R1 comprises a first part duplicated from first consecutive periodic segments of T and a second part duplicated from second consecutive periodic segments of T,
R2 comprises a third part duplicated from third consecutive periodic segments of T and a fourth part duplicated from fourth consecutive periodic segments of T, and
the first consecutive periodic segments, the second consecutive periodic segments, the third consecutive periodic segments, and the fourth consecutive periodic segments are different periodic segments of T.

13. The apparatus of claim 12, wherein
the first segment of T aligns with the first segment of the first part of R1 and the first segment of the third part of R2, and
the last segment of T aligns with the last segment of the second part of R1 and the last segment of the fourth part of R2.

14. The apparatus of claim 12, wherein T comprises n periodic segments, n being an integer greater than 1,
the first consecutive periodic segments comprise $n_1$ consecutive periodic segments of T not including the first periodic segment of T, $n_1$ being a positive integer,
the second consecutive periodic segments comprise $(n-n_1)$ consecutive periodic segments of T not including the last periodic segment of T,
the third consecutive periodic segments comprise $n_2$ consecutive periodic segments of T not including the first two periodic segments of T, $n_2$ being a positive integer, and
the fourth consecutive periodic segments comprise $(n-n_2)$ consecutive periodic segments of T not including the last two periodic segments of T.

15. The apparatus of claim 14, wherein the first consecutive periodic segments comprise the $(m_1+1)^{th}$ periodic segment through the $(m_1+n_1)^{th}$ periodic segment of T, $m_1$ being a positive integer smaller than or equal to $n_1$, $n_1$ being smaller than or equal to $(n-m_1)$,
the second consecutive periodic segments comprise the $(n_1-m_1+n)^{th}$ periodic segment through the $(n-m_1)^{th}$ periodic segment of T,
the third consecutive periodic segments comprise the $(m_2+1)^{th}$ periodic segment through the $(m_2+n_2)^{th}$ periodic segment of T, $m_2$ being a positive integer smaller than or equal to $n_2$ and different from $m_1$, $n_2$ being smaller than or equal to $(n-m_2)$, and
the fourth consecutive periodic segments comprise the $(n_2-m_2+n)^{th}$ periodic segment through the $(n-m_2)^{th}$ periodic segment of T.

16. The apparatus of claim 15, wherein the memory comprising the instructions operational with the processor to compare the part of T with the part of R1 and the part of R2 further comprises instructions which when executed by the processor become operational with the processor to:
compare a first part of T with the first part of R1 and the third part of R2, wherein the first part of T comprises the first $n_1$ periodic segment; and
compare a second part of T with the second part of R1 and the fourth part of R2, wherein the second part of T comprises the last $(n-n_1)$ periodic segment.

17. The apparatus of claim 16, wherein $n_1$ is equal to $n_2$.

18. A non-transitory computer-readable storage medium, comprising instructions for image-based abnormality detection for periodic patterns, which instructions when executed by a processor become operational with the processor to:
receive an image pattern T determined from an inspection image, wherein T comprises multiple periodic segments along a spatial direction;
determine a first reference pattern R1 by rearranging the multiple periodic segments of T in a first manner and a second reference pattern R2 by rearranging the multiple periodic segments of T in a second manner;
determine whether an abnormality exists in T by comparing a part of T with a part of R1 and a part of R2; and
determine that the abnormality exists in T based on a determination that the part of T is different from the part of R1 and the part of R2.

19. The non-transitory computer-readable storage medium of claim 18, wherein
R1 and R2 comprise the same number of segments with T,
R1 comprises a first part duplicated from first consecutive periodic segments of T and a second part duplicated from second consecutive periodic segments of T,
R2 comprises a third part duplicated from third consecutive periodic segments of T and a fourth part duplicated from fourth consecutive periodic segments of T, and
the first consecutive periodic segments, the second consecutive periodic segments, the third consecutive periodic segments, and the fourth consecutive periodic segments are different periodic segments of T.

20. The non-transitory computer-readable storage medium of claim 19, wherein the first segment of T aligns with the first segment of the first part of R1 and the first segment of the third part of R2, and the last segment of T aligns with the last segment of the second part of R1 and the last segment of the fourth part of R2.

* * * * *